United States Patent [19]

Posnansky

[11] 4,209,222
[45] Jun. 24, 1980

[54] INSTALLATION FOR UTILIZING SOLAR ENERGY WITH WAVELENGTH SELECTIVE REFLECTOR

[75] Inventor: Mario Posnansky, Ostermundigen, Switzerland

[73] Assignee: Bernardo Raimann, Trimbach, Switzerland; a part interest

[21] Appl. No.: 902,318

[22] Filed: May 3, 1978

[30] Foreign Application Priority Data

May 3, 1977 [CH] Switzerland ............... 5526/77

[51] Int. Cl.$^2$ .................. G02B 5/10; A01G 9/14; G02B 5/26
[52] U.S. Cl. .................. 350/1.6; 47/17; 350/299; 126/438
[58] Field of Search .......... 350/1.6, 1.5, 1.1, 299, 350/292, 310; 126/270, 271; 237/1 A; 47/17

[56] References Cited

U.S. PATENT DOCUMENTS

| | | | |
|---|---|---|---|
| 4,095,369 | 6/1978 | Posnansky et al. | 126/270 |
| 4,102,376 | 7/1978 | Sommer | 350/299 |
| 4,108,373 | 8/1978 | Chiapale et al. | 126/271 |
| 4,160,523 | 7/1979 | Stevens | 126/271 |

FOREIGN PATENT DOCUMENTS

2376378 12/1976 France ........................ 126/271

*Primary Examiner*—Jon W. Henry
*Attorney, Agent, or Firm*—Pollock, Vande Sande and Priddy

[57] ABSTRACT

By means of a plurality of reflectors, solar rays are focused on at least one operative region in which there is disposed a solar-radiation absorbent body which is thereby heated and which transmits the absorbed heat to a liquid or vaporous heat carrier. By fabricating the reflectors of a material permeable to the short-wave portion of the solar radiation and reflective of the long-wave portion of the solar radiation, the ground area shaded by the reflectors can be utilized for other purposes, especially for growing plants.

4 Claims, 7 Drawing Figures

INSTALLATION FOR UTILIZING SOLAR ENERGY WITH WAVELENGTH SELECTIVE REFLECTOR

This invention relates to an installation for utilizing solar energy, of the type having a plurality of reflectors capable of tracking the position of the sun for focusing the solar rays on at least one operative region, the reflectors being disposed on a frame.

In large and medium-sized installations hitherto proposed for utilizing solar energy, a relatively large area of the ground is shaded by the many reflectors, and this ground area is not exploited.

It is an object of this invention to provide an installation of the aforementioned type which makes it possible to exploit the reflector-shaded ground area for other purposes, especially for growing plants.

To this end, in the installation according to the present invention, an enterable open space exists between the frame and the ground, and at least some of the reflectors include a layer predominantly reflecting the long-wave range of solar radiation and permeable to the short-wave range of solar radiation for the purpose of utilizing the ground area shaded by these reflectors for growing plants.

Figure 1:
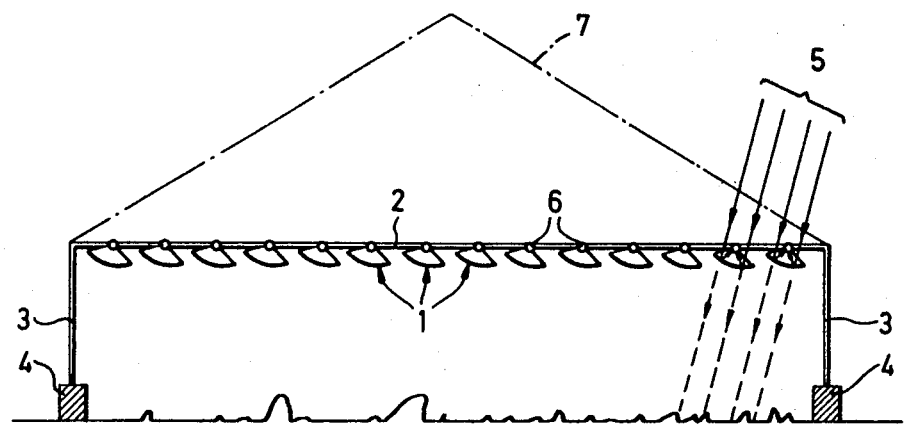
Figure 2:
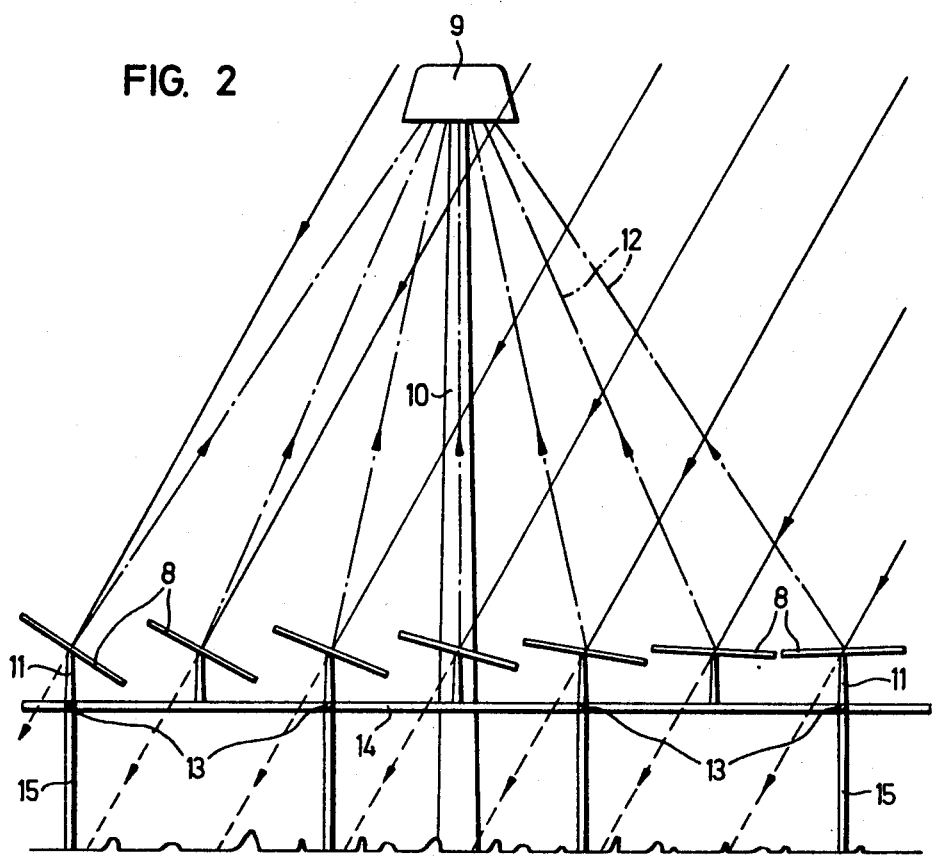
Figure 3:
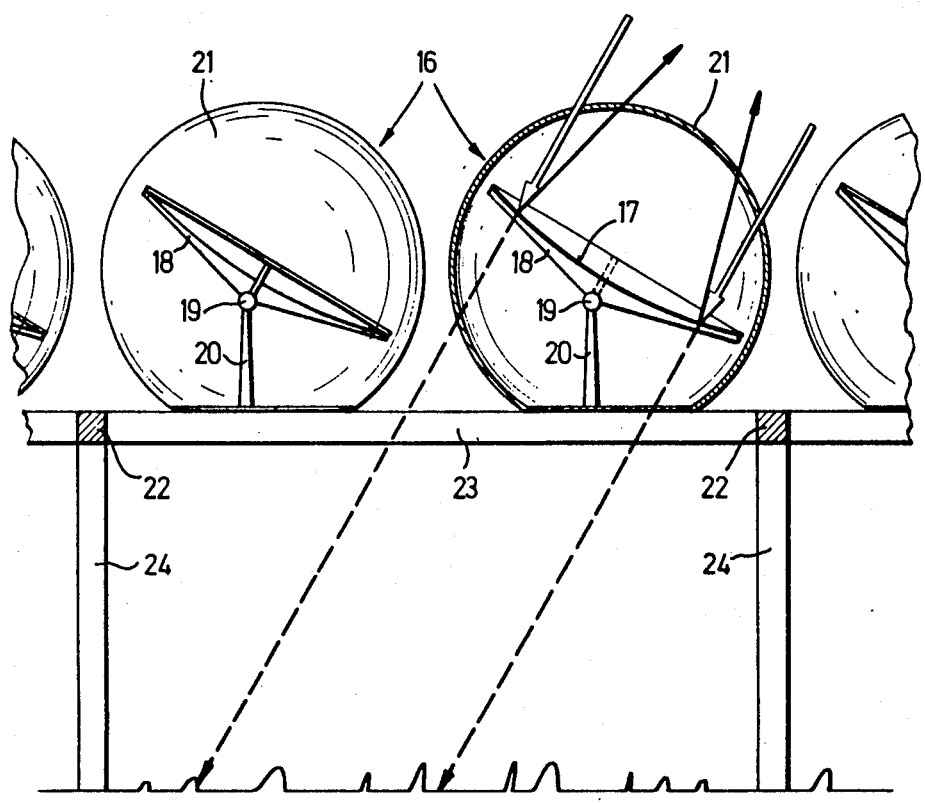
Figure 4:
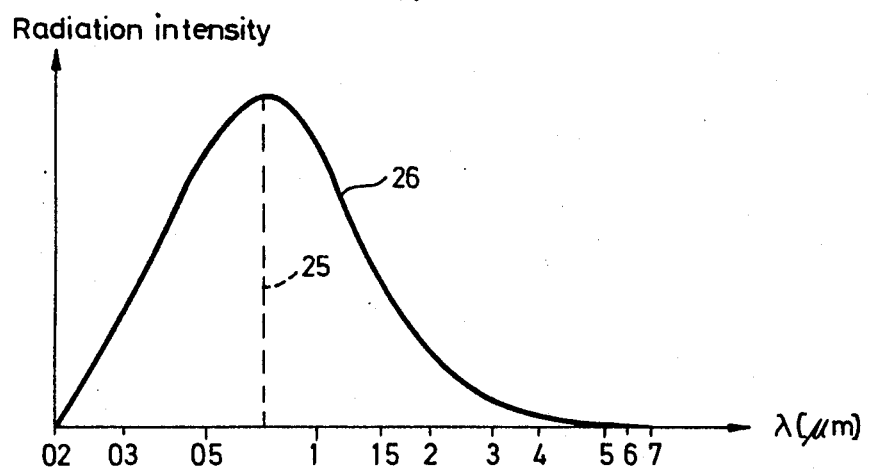
Figure 5:
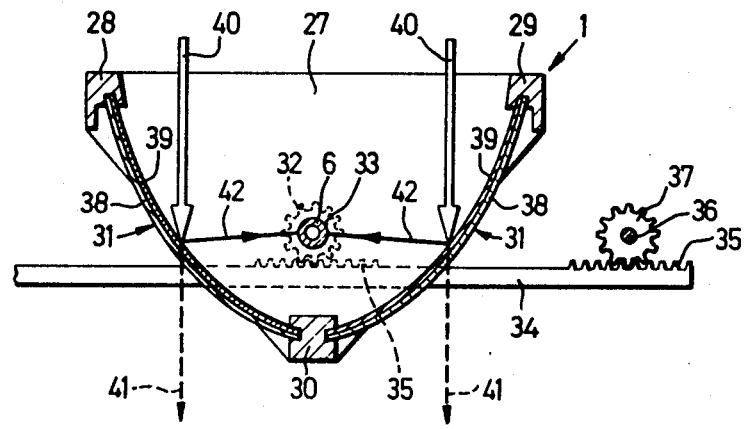
Figure 6:
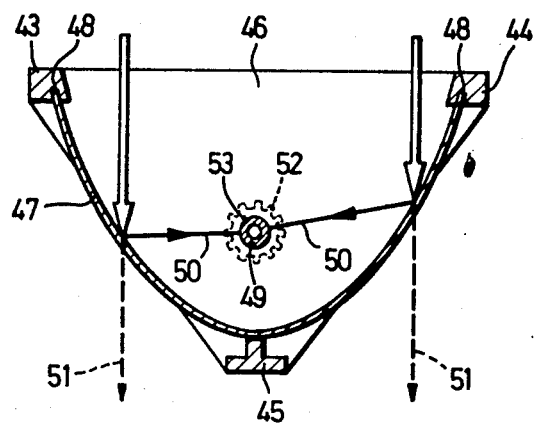
Figure 7:
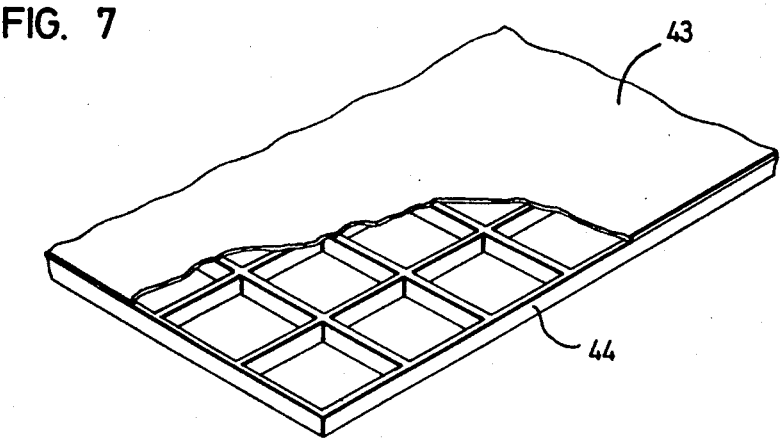

Preferred embodiments of the invention will now be described in detail with reference to the accompanying drawings, in which:

FIG. 1 is a simplified view of a number of parabolic cylindrical reflectors disposed on a frame above the ground, FIG. 2 is a simple representation of an installation for utilizing solar energy having a tower, at the top of which an absorber for solar rays is disposed, and in addition a plurality of reflectors mounted on a frame and reflecting the solar rays, FIG. 3 is a view of two individual reflectors, each disposed in a shell which is pervious to sunlight, FIG. 4 is a graph of the terrestrial solar spectrum, FIG. 5 is a cross-section through one of the reflectors shown in FIG. 1, FIG. 6 is a cross-section through a reflector in a further embodiment, and FIG. 7 is a partial view of a flat reflector.

FIG. 1 shows, in a simplified representation, an arrangement of a number of parabolic cylindrical reflectors 1 which will be described in more detail below with reference to FIG. 5. The reflectors 1 are pivotingly disposed on crossbeams 2, only one of which is visible, and can be caused to track the position of the sun with the aid of suitable means (not shown). Crossbeams 2 rest upon uprights 3 which are firmly anchored in the ground via concrete bases 4.

Reflectors 1 each focus part of the incident solar rays 5 upon a respective pipe 6 disposed along the focal axis of the reflector 1, the reflected solar radiation being absorbed by pipe 6 or by a black body disposed in the glass pipe. A liquid or gaseous medium flowing through the pipe absorbs the heat and conveys it to a heat accumulator (not shown) or to a heat engine (not shown).

In the case of previously proposed reflectors, the entirety of the solar radiation incident upon them is focused upon pipe 6, and the ground area beneath the reflectors is completely shaded. According to the present invention, at least some of the reflectors 1 are so constructed that they admit the short-wave portion of the terrestrial solar radiation, i.e., the radiation having a wave length of, e.g., 0.2 to 0.75 microns, and reflect to pipe 6 only the long-wave portion of the terrestrial solar radiation above a wave length of about 0.7 microns.

The reflectors 1 allow to pass to the ground beneath them that portion of the solar radiation which promotes plant growth. Hence the ground area which is more or less half-shaded by the reflectors 1 lends itself especially to growing plants, for the short-wave light necessary for the growth of plants is allowed to pass, and the long-wave radiation which accelerates the drying-out of the plants is kept away from the plants. In this manner, the water requirements of the plants are reduced to a minimum.

Above the frame comprising uprights 3 and crossbeams 2, a glass roof 7 may be disposed, as indicated by dot-dash lines in FIG. 1. The building illustrated in FIG. 1 may also be a workshop where work is done by daylight, but with the heat radiation being kept away from the workplaces and used for heating water or producing other forms of energy. By keeping the heat radiation away from the workplaces, cooling of the workrooms is made superfluous in most cases.

A solar power plant is illustrated purely diagrammatically in FIG. 2. The solar rays are reflected via a plurality of almost plane reflectors 8 onto a single absorber which is disposed in a dome 9 of a tower 10. Each reflector 8 is pivotingly mounted on a support 11 and can be caused to track the position of the sun (by means not shown) so that the solar rays 12 reflected thereby impinge upon the mentioned absorber. In the known solar power plants of the type described above, a gigantic area of the ground is shaded by the reflectors 8, this ground area not being exploited. If, however, according to the invention, at least some of the reflectors 8 are so constructed that they let the short-wave solar radiation through and reflect only the long-wave rays, at least part of the shaded ground area can be used, e.g., for growing plants. Here supports 11 are secured to a framework formed of longitudinal beams 13 and crossbeams 14. The framework is kept spaced from the ground by uprights 15 so that a space which may be comfortably entered exists between the framework and the ground.

The publication *Solar Energy Digest*, Vol. 8, No. 2 (February, 1977), describes a solar power plant being built in California which will produce electrical energy of 10 MW from solar energy. As reflectors, heliostats 16 developed by Boeing Engineering are used, illustrated in very simplified form in FIG. 3. A plurality of such heliostats reflect the solar rays to an absorber which is disposed on a tower in a similar manner to what is depicted in FIG. 2.

A film 17 reflecting the solar rays is stretched over a light, cruciform holder 18. Holder 18 is connected to a support 20 via a ball-and-socket joint 19. Suitable means (not shown) cause the heliostat to track the position of the sun so that the solar rays reflected by the heliostat reach the absorber (not shown). The support 20 and the film 17 are disposed in an almost spherical dome 21 made of a material permeable to solar radiation in order to protect film 17 from atmospheric influences and precipitation.

It is now proposed not to anchor supports 20 directly in the ground but to secure them to a framework formed from longitudinal beams 22 and crossbeams 23, which framework is held by uprights 24 at a sufficient distance from the shaded ground area so that it is possible to walk around comfortably on that shaded area. Film 17 is provided with a layer which is permeable to short-wave light and which reflects the long-wave portion of the solar radiation to the mentioned absorber. The shaded ground area, otherwise useless, can thereby be exploited for growing plants.

FIG. 4 is a graph of the radiation intensity as a function of the wave length λ of the terrestrial solar spectrum. If, for example, the radiation-reflecting parts of the reflectors take the form of a glass substrate coated with a selective layer of the material manufactured and marketed by the firm of Balzers AG in Balzers, Principality of Liechtenstein, under the trade name "Calflex 81 K1", the short-wave rays of from 0.2 to 0.7 microns are admitted up to 90%, and the long-wave rays of from 0.75 to at least 2.5 microns are virtually completely reflected. Relative to FIG. 4, this means that the visible radiation with wave lengths to the left of the dashed straight line 25 are allowed to pass, and the heat radiation with greater wave lengths, to the right of line 25, are reflected. The area divided by line 25, bounded by curve 26 and the abscissa, corresponds to the portions of radiant energy which are respectively passed and reflected by the film, the ratio of passed radiant energy to reflected radiant energy being about 45 to 55.

FIG. 5 is a cross-section through one of the reflectors 1 of the installation shown in FIG. 1. Each reflector 1 has on each end face a sidewall 27. Together with longitudinal members 28, 29, and 30, sidewalls 27 form a cage in which a number of parabolically-shaped reflector segments 31 are held. Rigidly secured to the outside of each sidewall 27, only one of which can be seen in FIG. 5, is a pinion 32. Through an opening 33 in the center of pinion 32 and through a corresponding opening in sidewall 27, pipe 6 extends along the focal line of reflector 1 for conveying a heat carrier through the operative region of the reflector. Pipes 6 of reflectors 1 are rigidly connected to crossbeams 2 of the frame illustrated in FIG. 2. Reflectors 1 are pivotable about pipes 6. The individual pipes 6 of reflectors 1 are connected in series one behind the other so that the heat carrier flows through all pipes 6. By means of racks 34, which are provided wholly or in part with teeth 35, and which mesh with pinions 32, a synchronous pivotal movement of all reflectors 1 is achieved in that, by means of further pinions disposed on a shaft 36, racks 34 are displaced to the left or to the right, as viewed in FIG. 5. The drive (not shown) of shaft 36 is controlled by a regulating device (not shown) as a function of the position of the sun. Only one of the racks 34 is shown in FIG. 5.

The parabolically-shaped reflector segments 31 each comprise a light-permeable substrate 38, preferably of glass, to which the above-mentioned layer of "Calflex 81 K1" is applied.

The reflector 1 constructed as described above separates the solar radiation entering the reflector, which radiation is indicated by two arrows 40, into a short-wave portion, arrow 41, and a long-wave portion, arrow 42. The short-wave portion passes virtually unhindered through reflector 1 and reaches the ground area beneath. The long-wav portion is focused on pipe 6 and heats the heat carrier flowing through pipe 6.

FIG. 6 shows an extremely light embodiment of a reflector intended to be installed under a protective roof of glass or other transparent material. This reflector comprises three longitudinal members 43, 44, and 45, the ends of which are secured to two sidewalls 46, only one of which is visible in FIG. 6. The edges of a relatively stiff film 47 are held in longitudinal grooves 48 in members 43 and 44, so that film 47 is curved and has substantially the shape of a parabolic cylindrical reflector. Film 47 has optical properties similar to those of the aforementioned layer of "Calflex 81 K1" and is commercially available under the trade name "Tedlar-Folie." Extending along the focal line of the partially permeable reflector formed by film 47 is a pipe 49 in which the preferably liquid heat carrier is heated predominantly by the long-wave radiation portion reflected by film 47 (see arrows 50), whereas the short-wave radiation portion indicated by arrows 51 reaches the ground area beneath the reflector. Secured to the outside of each sidewall 46 is a pinion 52, pipe 49 extending through an opening 53 in each sidewall 46 and through each pinion 52. The reflector illustrated in FIG. 6 can be caused to track the position of the sun by means of a rack as shown in FIG. 5.

FIG. 7 shows part of a reflector 8 as used in the installation of FIG. 2. A film 54, which may, for example, be the above-mentioned "Tedlar-Folie" or film having a layer of a material exhibiting selective properties similar to those of "Tedlar-Folie," is stretched over a grate 55. The grate may be made of metal for reasons of mechanical strength, the major part of the long-wave radiation reaching the ground beneath through the reflector. The grate may instead be made of glass so that virtually the entire short-wave portion of the solar energy reaches the ground area.

The means for causing the reflectors and the heliostats 16 to track the position of the sun are known per se and consequently need not to be described in detail.

What is claimed is:

1. An installation for utilizing solar energy, comprising a plurality of reflectors capable of tracking the position of the sun for focusing the solar rays on at least one operative region, the reflectors being disposed on a frame, wherein an enterable open space is provided between the frame and the ground, at least some of the reflectors including a layer predominantly reflecting the long-wave range of solar radiation and being permeable to the short-wave range of solar radiation for the purpose of utilizing the ground area shaded by the reflectors for growing plants.

2. The installation of claim 1, wherein said layer is permeable to radiation having wave lengths shorter than 0.75 microns and for the most part reflects radiation of more than 0.75 microns.

3. The installation of claim 1, wherein said layer is self-supporting and is disposed on a grating.

4. The installation of claim 1, wherein said layer is disposed on a transparent substrate of glass.

* * * * *